(12) United States Patent
Kumar et al.

(10) Patent No.: US 12,717,674 B2
(45) Date of Patent: Aug. 25, 2026

(54) MACHINE LEARNING-DRIVEN ORCHESTRATION ENGINE FOR MANAGING APPLICATION PROGRAMMING INTERFACE FAILURES IN CONTAINER-BASED DATA PROTECTION SYSTEMS

(71) Applicant: Dell Products L.P., Round Rock, TX (US)

(72) Inventors: Avinash Kumar, Patna (IN); Gururaj Kulkarni, Bangalore (IN); Shelesh Chopra, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/024,698

(22) Filed: Jan. 16, 2025

(65) Prior Publication Data

US 2026/0203158 A1 Jul. 16, 2026

(51) Int. Cl.
*G06F 11/07* (2006.01)
*G06F 11/00* (2006.01)

(52) U.S. Cl.
CPC ...... *G06F 11/0793* (2013.01); *G06F 11/0709* (2013.01); *G06F 11/079* (2013.01); *G06F 11/008* (2013.01)

(58) Field of Classification Search
CPC .. G06F 11/008; G06F 11/0709; G06F 11/079; G06F 11/0793
See application file for complete search history.

(56) References Cited

U.S. PATENT DOCUMENTS 8,060,792 B2 * 11/2011 Sivasubramanian ........................ G06F 9/5061 714/47.1
10,699,010 B2 * 6/2020 Subbarayan ........... G06N 20/00
2005/0187930 A1 8/2005 Subramanian et al.
2006/0288256 A1 12/2006 Mathew et al.
2008/0301651 A1 12/2008 Seneski et al.
2015/0220376 A1 8/2015 Srivastava
2018/0203754 A1 7/2018 Beohar et al.
2022/0217153 A1 7/2022 Krishnan et al.
2023/0153191 A1 5/2023 Gennetten et al.
2023/0409714 A1 12/2023 Chen et al.

(Continued)

FOREIGN PATENT DOCUMENTS

WO WO-2022093239 A1 * 5/2022 .......... G06F 11/3006

*Primary Examiner* — Joseph R Kudirka
(74) *Attorney, Agent, or Firm* — Chamberlain, Hrdlicka, White, Williams & Aughtry; Aly Z. Dossa

(57) ABSTRACT

A method for managing a data protection system includes monitoring, by an interaction manager, a data protection workload executing on the data protection system, wherein the data protection system comprises a plurality of services, and wherein the data protection workload is executed by the plurality of services communicating with each other using application programming interface (API) calls, obtaining, based on the monitoring, a copy of the API calls, performing an embedding on the copy of the API calls to obtain API embeddings, applying the API embeddings to a failure prediction engine to obtain a failure prediction for the data protection workload, performing a remediation action on the API calls to remediate the data protection workload, and updating the failure prediction engine based on the remediation action.

17 Claims, 11 Drawing Sheets

(56) References Cited

U.S. PATENT DOCUMENTS

2023/0412629 A1* 12/2023 Beveridge ........... H04L 63/1433
2025/0165365 A1 5/2025 Chandavarkar et al.

* cited by examiner

MACHINE LEARNING-DRIVEN ORCHESTRATION ENGINE FOR MANAGING APPLICATION PROGRAMMING INTERFACE FAILURES IN CONTAINER-BASED DATA PROTECTION SYSTEMS

BACKGROUND

In a large-scale data environment, thousands of payloads may be created and destroyed on a daily basis, high volumes of synchronous and asynchronous message transfers may be performed. The possibility exists for scenarios in which computing devices in the data environment must undergo disaster failover or otherwise become unavailable during the message transfers.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
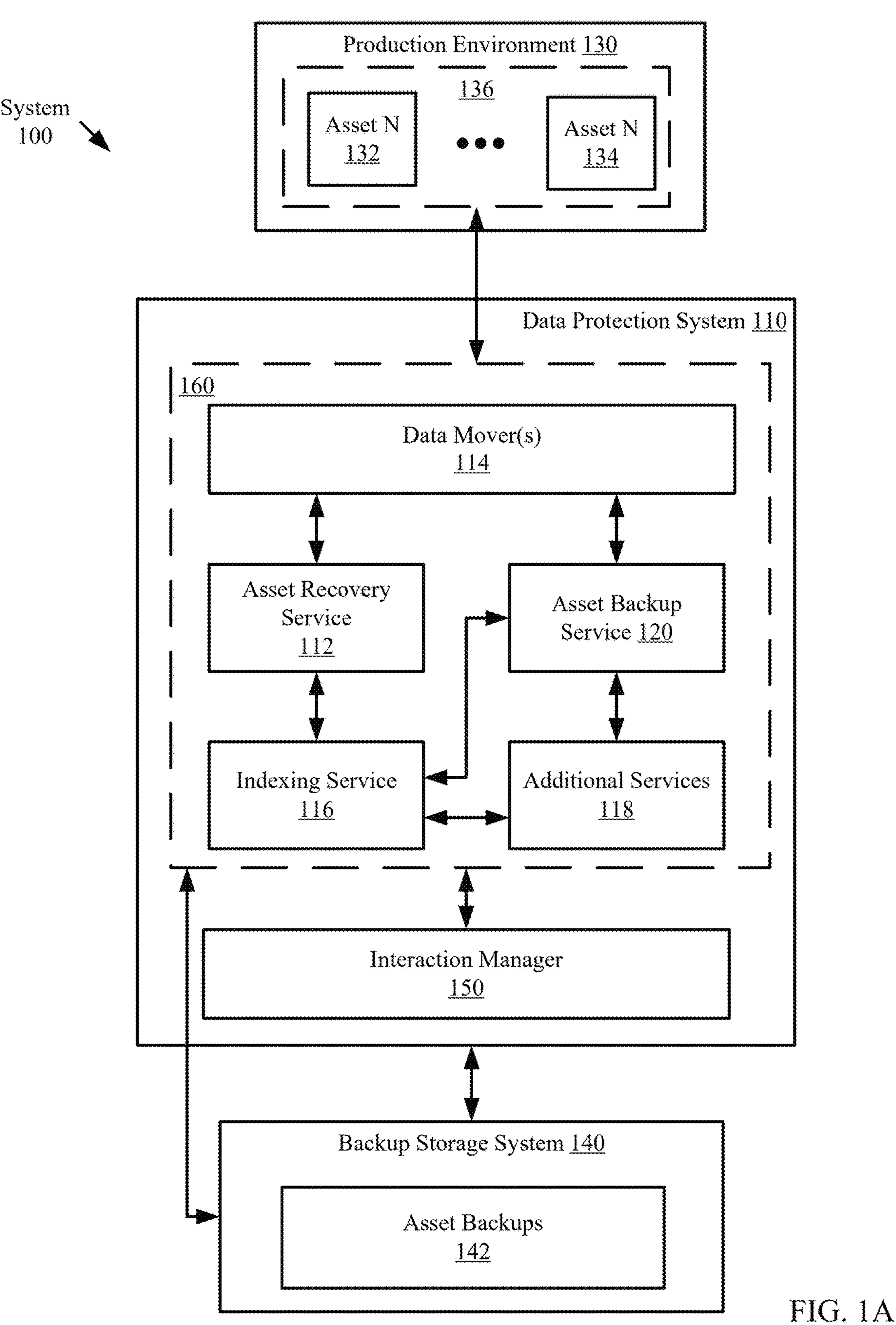
FIG. 1A shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details, and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this disclosure, elements of figures may be labeled as A to N, A to P, A to M, or A to L. As used herein, the aforementioned labeling means that the element may include any number of items, and does not require that the element include the same number of elements as any other item labeled as A to N, A to P, A to M, or A to L. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, operably connected, or operative connection, means that there exists between elements, components, and/or devices a direct or indirect connection that allows the elements to interact with one another in some way. For example, the phrase 'operably connected' may refer to any direct (e.g., wired directly between two devices or components) or indirect (e.g., wired and/or wireless connections between any number of devices or components connecting the operably connected devices) connection. Thus, any path through which information may travel may be considered an operable connection.

Embodiments of the invention include systems and methods for monitoring and orchestrating interactions of services in a data protection system. Embodiments of the invention use an interaction manager that captures the inbound and outbound payloads processed by each service in the data protection system. When a failure occurs, a replay framework is triggered, allowing the system to replay the sequence of application programming interface (API) calls and payloads involved in the failed operation. This replay includes the full business logic flow, providing a detailed trace that makes it easier to pinpoint where the error occurred. By implementing the replay framework, embodiments of the invention provide systematic troubleshooting by recreating the exact conditions under which the failure happened, facilitating a prompt resolution.

Embodiments of the invention further include using the interaction manager for detecting patterns in historical API failures using machine learning models embedded in a predictive insight framework. By recognizing recurring issues and correlating them with specific payloads and business logic failures, the system can proactively detect potential problems before they occur. In such embodiments, the orchestration engine also learns from past failures, continuously improving its ability to predict and prevent future disruptions by updating the machine learning models.

By combining machine learning with real-time analytics, the AI model enables a more intelligent, adaptive response to operational challenges.

In one or more embodiments, the combination of the replay framework and the use of machine learning models to detect patterns provide a holistic system for efficiently identifying, reproducing, and resolving API failures in complex, multi-service, container-based data protection systems, minimizing downtime and enhancing system reliability.

Embodiments of the invention further include using the API simulation engine for synthetic workflow generation and simulation to mimic real-world scenarios between the services. The generation of the synthetic workflow may leverage the use of generative adversarial networks (GANs). The GANs may be used to generate synthetic traffic while dynamically evaluating the health and reliability of API workflows. The API simulation engine may integrate seamlessly with the ecosystem of services in the data protection system, modeling cross-product dependencies among multiple production environments. By employing this intelligent framework, the system may predict cascading failures, recommend preventive actions, and ensure robust performance across diverse workflows.

Embodiments of the invention may also utilize the intelligent framework to refine its predictive capabilities over time by continuously learning from simulation outcomes. By integrating telemetry data with real-time insights, this solution may enable automated optimization of API workflows, even for previously unknown failure scenarios. This ensures seamless functionality and enhanced reliability for containerized environments.

Embodiments of the invention further include integrating a Dynamic API Reliability Scoring and Subsystem Health Prediction Framework that uses heuristics, forecasting, and AI-driven subset metrics to ensure system reliability. In one or more embodiments, API-level reliability scoring is combined with subsystem health evaluation to provide a holistic view of system performance. The framework analyzes historical API data, such as error rates, response times, and throughput, to calculate a dynamic reliability score for each API. By employing extrapolation techniques, it forecasts future performance trends, enabling early identification of high-risk APIs.

Embodiments of the invention further include an AI-driven closed-loop failure recovery system to address the challenges of failure management in distributed data system environments. In one or more embodiments, the interaction manager continuously monitors performance metrics of the services through an intelligent system tracker. The interaction manager may employ an anomaly detection using a machine learning algorithm such as Isolation Forests to identify deviations indicative of failures in real-time. This method may help immediately detect issues like service unavailability, abnormal latencies, or resource contention, enabling rapid intervention.

Various embodiments of the invention are described below.

FIG. 1A shows an example system in accordance with one or more embodiments of the invention. The system includes a production environment (130), a data protection system (110), and a backup storage system (140). The components in the system may be operably connected via any combination of wired and/or wireless connections. The system may include additional, fewer, and/or different components without departing from the invention. Each component in the system is operably connected via any combination of wired and/or wireless connections.

In one or more embodiments disclosed herein, the production environment (130) provides computer-implemented services to users operating the production environment (130). The computer-implemented services may be provided using applications (not shown) executing on the production environment (130). The applications may be logical entities executed using computing resources of the production environment (130). For example, the applications may host components. The components may be, for example, instances of databases, email servers, operating systems, virtual machines, and/or other components. The applications may host other types of components without departing from the invention.

The applications may generate, use, or otherwise access any number of assets (136) stored in the production environment. The assets (136) may each be data structures that, when utilized by the production environment (130), provide the services to the users. Examples of assets (132, 134) include, but are not limited to, databases, virtual machine disks, virtual disks, file systems, application data, and streaming data.

Figure 5:
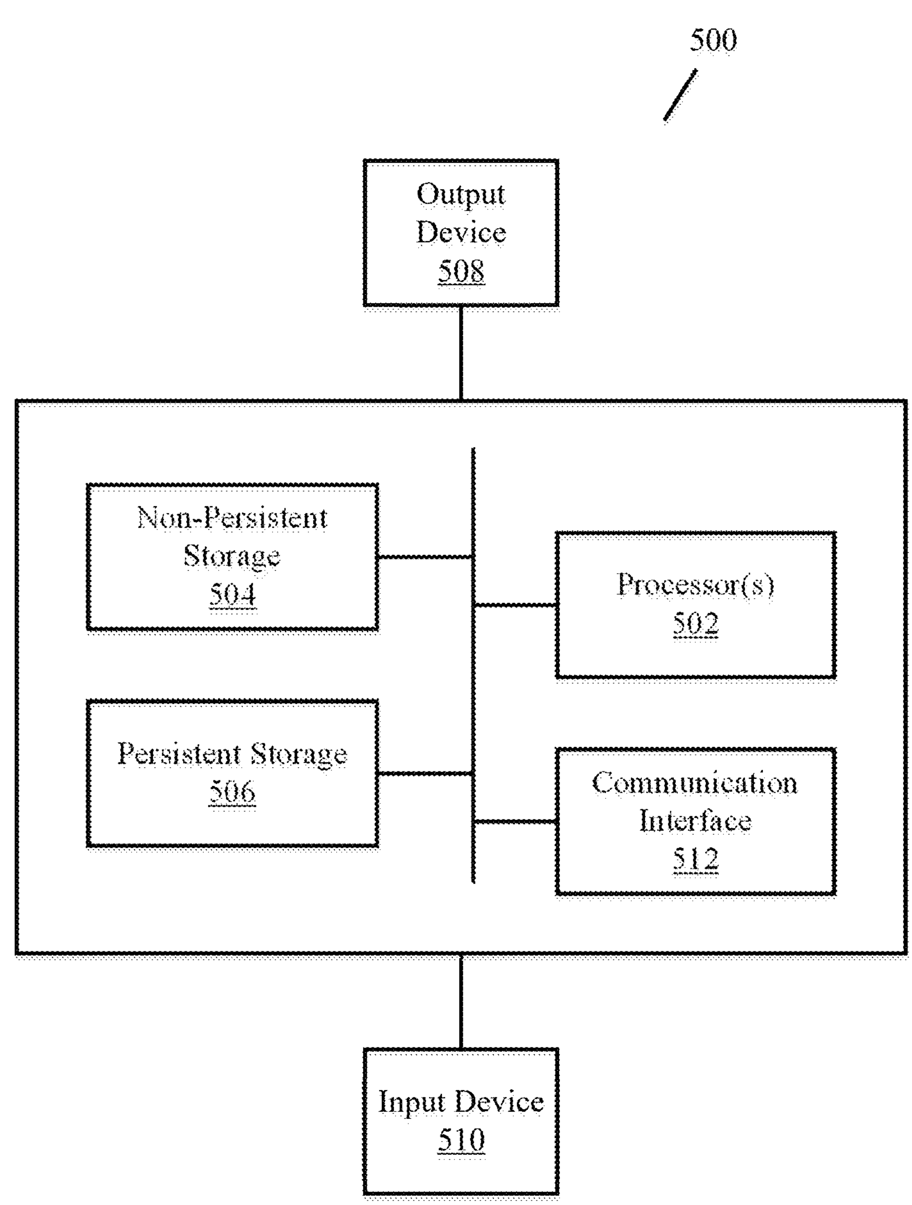
FIG. 5 shows a diagram of a computing device in accordance with one or more embodiments of the invention.

In one or more embodiments, the production environment (130) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production environment (130) described throughout this application.

In one or more embodiments disclosed herein, the production environment (130) is implemented as a logical device. The logical device may utilize the computing resources of any number of computing devices and thereby provide the functionality of the production environment (130) described throughout this application.

In one or more embodiments, the assets (136) are protected using a data protection system (110). The data protection system (110) includes functionality for servicing data protection tasks such as backing up, restoring, and indexing the assets (136) and asset backups (142). The assets may be backed up in a backup storage system (140) that stores the asset backups (142). To provide the data protection tasks, the data protection system (110) includes any number of services (160). The one or more services (160) may include one or more data movers (114), an asset recovery service (112), an asset backup service (120), an indexing service (116), and any other additional services (118). The data protection system (110) may include additional, different, and/or different services (160) without departing from the invention.

In one or more embodiments, the data movers (114) include functionality for performing data transfer of asset data to and/or from the production environment (130). The data movers (114) may store asset backups (142) in the backup storage system and recover the asset backups (142) to the production environment (130) in accordance with tasks initiated by the other services (160).

In one or more embodiments, the asset recovery service (112) is implemented as a service that obtains and processes requests for restoring assets from the backup storage system (140) to the production environment (130). The asset backup service (120) may be implemented as a service that obtains and processes requests for backing up assets (136) to the backup storage system (140). The indexing service (116) may be implemented as a service that indexes stored assets, stored asset backups (142), and/or other entities for reference by the production environment (130). Additional services (118) may each be implemented as one or more services.

In one or more embodiments, each of the services (160) is implemented as an application container. The application container may be a logical partitioning of computing resources that are used to provide the functionality of the respective service. In one or more embodiments, the services (160) communicate with each other using application programming interface (API) interactions such as API requests, API responses, or other API calls.

As an example, an asset backup service (120) may service a backup request to back up one of the assets (136). To service the backup request and initiate a data protection workload, the asset backup service (120) may issue an API call to one of the data movers (114) to copy asset data from the production environment (130) and store the copy in the backup storage system (140). Further, the asset backup service (120) may issue an API call to the indexing service (116) for indexing the stored asset backup. In this example, the order in which API calls are issued may be significant, as the asset backup service (120) may prefer issuing the API call to the data mover (114) before issuing the API call to the indexing service (116) to prevent any discrepancies caused by attempting to store and index a backup. Further, if an API call is serviced too slowly, one of the services may time out or otherwise indicate that the API call has failed.

Examples of additional services (118) executing in the data protection system (110) (or external to the data protection system (110)) include, but are not limited to: user interface (UI), backup policy managers, backup scheduler, one or more pillar services, and a workflow manager.

In one or more embodiments. data protection workloads may experience failures during, before, or after communications between the services (160). The failures may be caused by factors that may not become apparent immediately without analyzing such communications. For example, it may be beneficial to analyze all API calls used for a data protection workload to identify the cause of the failure and to identify a remediation action to be performed to resolve the failure. Further, the analysis of the API calls for a failed data protection workload may be analyzed to prevent future failures.

To aid in the resolution of failures of data protection workloads and/or to take preventive action for future data protection workload failures, the data protection system (110) further includes an interaction manager (150). While the interaction manager (150) is illustrated in FIG. 1A as a component of the data protection system, the interaction manager (150) may be a separate component without departing from the invention. In one or more embodiments, the interaction manager (150) includes functionality for monitoring the services (160) and analyzing the communications between the services (160) to remediate any failures in data protection workloads and/or to prevent future possible failures. To perform such functionality, the interaction manager (150) may perform the methods of FIGS. 2B-3D. For additional details regarding the interaction manager (150), refer to FIG. 1B.

In one or more embodiments disclosed herein, the interaction manager (150) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the interaction manager (150) described throughout this application.

In one or more embodiments disclosed herein, the interaction manager (150) is implemented as a logical device. The logical device may utilize the computing resources of any number of computing devices and thereby provide the functionality of the interaction manager (150) described throughout this application.

In one or more embodiments disclosed herein, the data protection system (110) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data protection system (110) described throughout this application.

In one or more embodiments disclosed herein, the data protection system (110) is implemented as a logical device. The logical device may utilize the computing resources of any number of computing devices and thereby provide the functionality of the data protection system (110) described throughout this application.

While the system of FIG. 1A has been illustrated and described as including a limited number of specific components, a system in accordance with embodiments of the invention may include additional, fewer, and/or different components without departing from the invention.

Figure 1B:
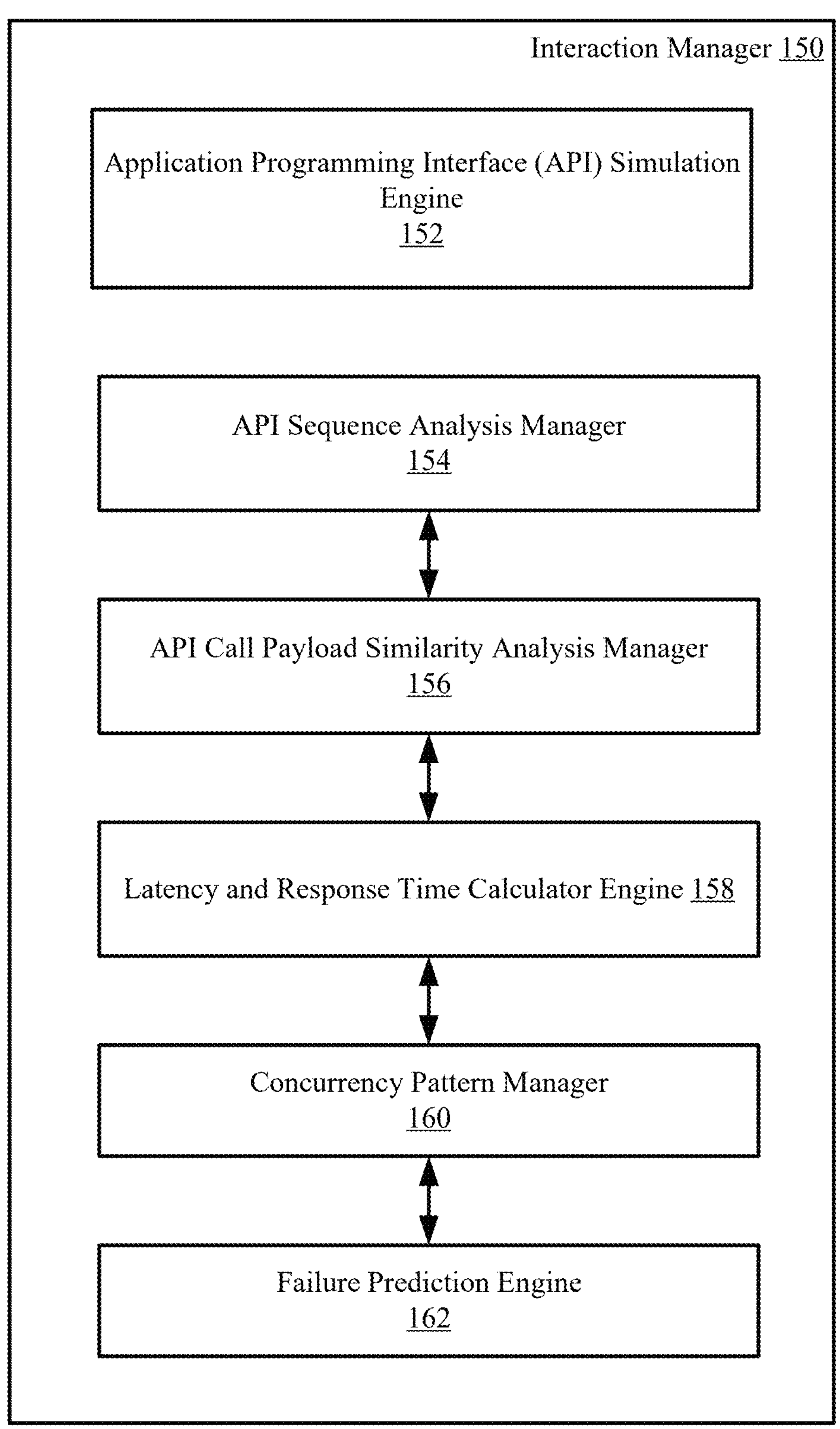
FIG. 1B shows a diagram of an interaction manager without departing from the invention.

FIG. 1B shows a diagram of an interaction manager in accordance with one or more embodiments of the invention. The interaction manager (150) may be an embodiment of the interaction manager (150, FIG. 1A) discussed above. The interaction manager (150) may include an application programming interface (API) simulation engine (152), an API sequence analysis manager (154), an API call payload similarity analysis manager (156), a latency and response time calculator engine (158), a concurrency pattern manager (160), and a failure prediction engine (162). The interaction manager (150) may include additional, fewer, and/or different components without departing from the invention.

In one or more embodiments, the API simulation engine (152) includes functionality for simulating interactions between services (e.g., 160, FIG. 1A) for the purposes of analysis, resolution, or otherwise evaluation of data protection workload failures. Specifically, the API simulation engine (152) may generate a simulation environment that recreates one or more services used for the data protection workload(s) being evaluated. The simulated environment may implement a replay framework that executes each of the API calls for a data protection workload to identify a failure point of the data protection workload. The interaction manager (150) may include functionality for resolving the failure points based on the cause of the failure point. The failure point may be caused by, for example, a disordering of a sequence of API calls, a timeout of one of the services in responding to an API call, an overloading of one of the services based on computing resource misuse, and/or a detected pattern of communication that historically has caused previous failures.

In one or more embodiments, the API simulation engine (152) further includes functionality for generating synthetic workloads based on historical API calls and simulating the synthetic workloads to analyze failure points in the synthetic workloads. In one or more embodiments, a synthetic workload is a type of workload that is generated by the API simulation engine (152) and may or may not have been executed in the data protection system (110, FIG. 1A) discussed above. The synthetic workload may be generated using a generative adversarial network (GAN). The GAN may be a machine learning algorithm that generates synthetic objects (e.g., data protection workloads) based on historical data. As used by the API simulation engine (152) the GAN may obtain, as an input, a set of historical API calls used for previous data protection workloads, and use a generator and discriminator to output a combination of historical data protection workloads and artificial data protection workloads that were not previously executed. The artificial data protection workloads may be generated such that the discriminator is unable to accurately detect whether the artificial data protection workloads are artificial. The combination of historical and artificial data protection workloads may be referred to as synthetic workloads.

In one or more embodiments, the synthetic workloads are simulated by the API simulation engine (152) to detect potential failures of future data protection workloads. Such functionality may be further described, for example, in the method of FIG. 2B.

In one or more embodiments, the API sequence analysis manager (152) includes functionality for identifying, for a set of historical API calls, a sequence of API calls for each data protection workload. The sequence may represent a timeline or ordering of the API calls for a given data protection workload. The timeline and/or ordering is identified based on, for example, a timestamp of the historical API calls, a specified corresponding data protection workload, and/or based on request and/or responses of the services involved in the data protection workload. The API sequence analysis manager (152) may process the identified sequences by, for example, determining dependencies in API calls. For example, the API sequence analysis manager (152) implements a recurring neural network (RNN) algorithm on API embeddings of each of the historical API calls to determine the dependencies.

In one or more embodiments, the API call payload similarity analysis manager (156) includes functionality for analyzing the payload of the historical API calls to understand failure points of data protection workloads. For example, the payload of the API calls may include parameters that are processed by the services. Similar payload parameters may be associated with similar patterns for failure points. In one or more embodiments, the API call payload similarity analysis manager (156) performs a vectorization of the API payloads to obtain a vectorized representation of each API payload. The RNN algorithm may analyze the vectorized representations to determine patterns of failure points and/or any other patterns detectable using the API payloads. For example, if two API requests with nearly identical payloads consistently cause the same error, the RNN will learn this pattern and associate it with the failure condition.

In one or more embodiments, the latency and response time calculator engine (158) includes functionality for calculating latency and response times of the API calls and determining potential performance bottlenecks or failures in data protection workloads. In a distributed environment such as the data protection system (110, FIG. 1A) discussed throughout the present disclosure, the time taken for each service to respond to an API request may vary depending on network load, concurrent requests, and/or resource availability of the services responding. As such, the time taken to respond to API requests are tracked. In one or more embodiments, the response times are processed as time series, with each API call latency being an input to the RNN model. The RNN algorithm may process the response times to model latency trends over time and model how spikes (or sudden increases) in latency may precede a failure. To further account for variations in response times across API calls, the RNN model may employ a time-decay mechanism to weigh recent latency data more heavily than older data, allowing it to react quickly to current performance issues. The result of the analysis of the response times and the time-decay mechanism is a latency and response model.

In one or more embodiments, the concurrency pattern manager (160) includes functionality for determining and processing concurrency in the historical API calls. The concurrency may describe a volume of API requests issued to a service within a concurrent period of time. The processing of the concurrent API calls may include identifying the volume of the API requests being processed or in a queue to be processed by a service at a point in time and determining a capacity threshold volume for a given service that, if exceeded, may cause the service to fail and not process all API calls in the volume. In one or more embodiments, the number of concurrent API calls being handled by each service is represented in a concurrency matrix. This matrix tracks which services are running simultaneously and at what volume. Using the concurrency matrix, the RNN model learns to predict when a service is reaching its capacity threshold volume, where additional API calls may cause performance degradation or outright failure. By monitoring these concurrency patterns, the RNN model may raise alerts before the system becomes overwhelmed.

In one or more embodiments, the failure prediction engine (162) includes functionality for obtaining outputs from the API sequence analysis manager (154), the API call payload similarity analysis manager (156), the latency and response time calculator engine (158), and the concurrency pattern manager (160) to fully train the RNN model. The failure prediction engine (162) may include functionality for inputting information about the API calls, including vectorized information, and outputting any combination of: (i) one or more identified failure points for data protection workloads associated with the input information, and (ii) remediation actions to be performed to resolve any detected failure points. The failure prediction engine, and any models used for processing input information, may be updated and/or otherwise managed using, for example, the methods of FIG. 3A-3D.

Figure 2A:
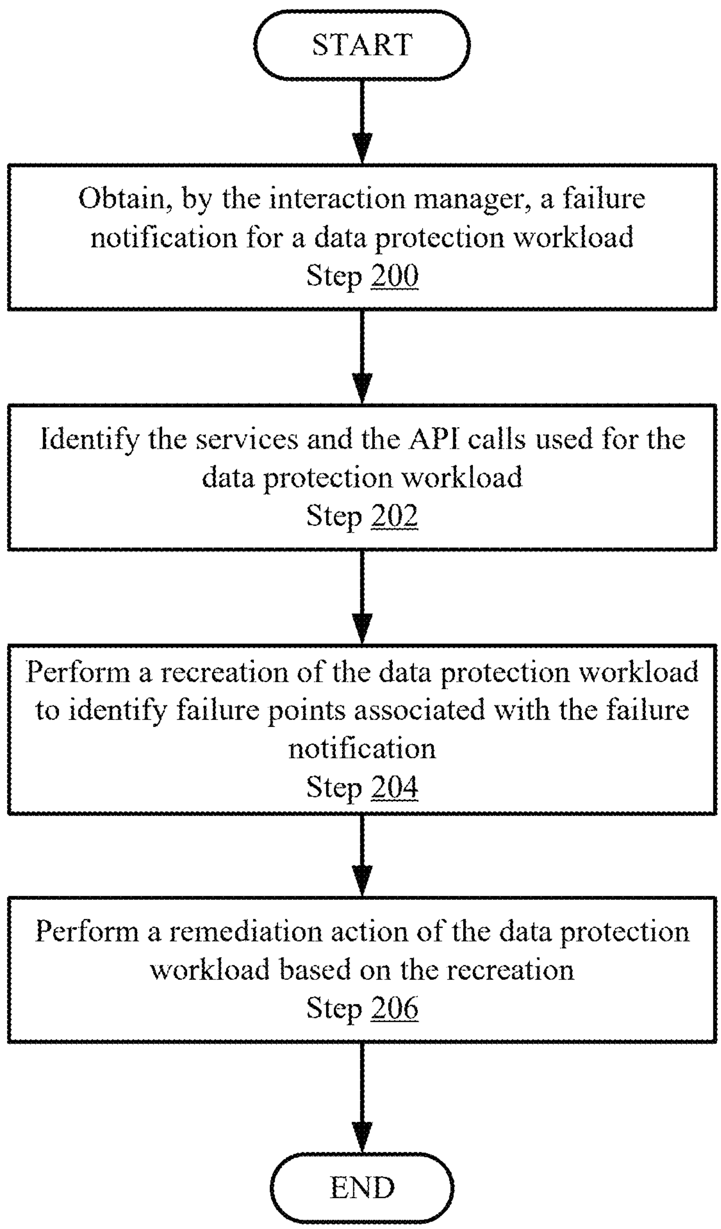
FIG. 2A shows a flowchart of a method for servicing a failure notification for a data protection system using an application programming interface (API) simulation engine in accordance with one or more embodiments of the invention.

FIG. 2A shows a flowchart of a method for servicing a failure notification for a data protection system using an application programming interface (API) simulation engine in accordance with one or more embodiments of the invention. The method shown in FIG. 2A may be performed by, for example, an interaction manager (150, FIG. 1). Other components of the system illustrated in FIG. 1A may perform the method of FIG. 2A without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

Turning to the method, in step 200, a failure notification is obtained for a data protection workload. In one or more embodiments, the failure notification indicates a failure in completing, or otherwise executing portions of, the data protection workload. As discussed throughout the present disclosure, the data protection workload may be executed, or otherwise realized, using API calls initiated and/or serviced by services of a data protection system.

In step 202, services and API calls associated with the data protection workload are identified. In one or more embodiments, the API calls are identified using an identifier corresponding to the data protection workload specified in each API call. The services may be identified based on whether a given service in the data protection system initiated or otherwise serviced one or more API calls that specified the identifier of the data protection workload.

In one or more embodiments, the API calls are identified based on a monitoring performed on the data protection system by monitoring inbound and outbound API calls of one or more services in the data protection system and embedding the API calls with a unique trace identifier across multiple API calls. The unique trace identifiers may each be the identifier of the corresponding data protection workload. Logs of the API calls may specify the API calls used for a given data protection workflow.

In step 204, a recreation of the data protection workload is performed to identify failure points associated with the failure notification. In one or more embodiments, the recreation includes obtaining a copy of the API calls (e.g., either from the services or from a database of the interaction manager), simulating the identified services using an API simulation engine and commanding each simulated service to execute the copy of API calls in an identical format (including concurrency of servicing API calls, time taken between a request and a response, a sequence of API calls). Based on the recreation, a failure point is determined by analyzing the recreation to determine one or more factors that prevented the data protection workload from executing and completing successfully. Examples of factors include, but are not limited to: an overload of one of the services, a timeout caused by delay to respond, a disordering of a sequence of API calls, and a recognized pattern of API calls that tend to cause the failure.

In step 206 a remediation action of the data protection workload is performed based on the recreation. In one or more embodiments, the remediation action includes re-initiating the data protection workload, re-organizing the order of tasks to reduce overloading or disordering of API calls, and otherwise resolving any dependencies between API calls.

Figure 2B:
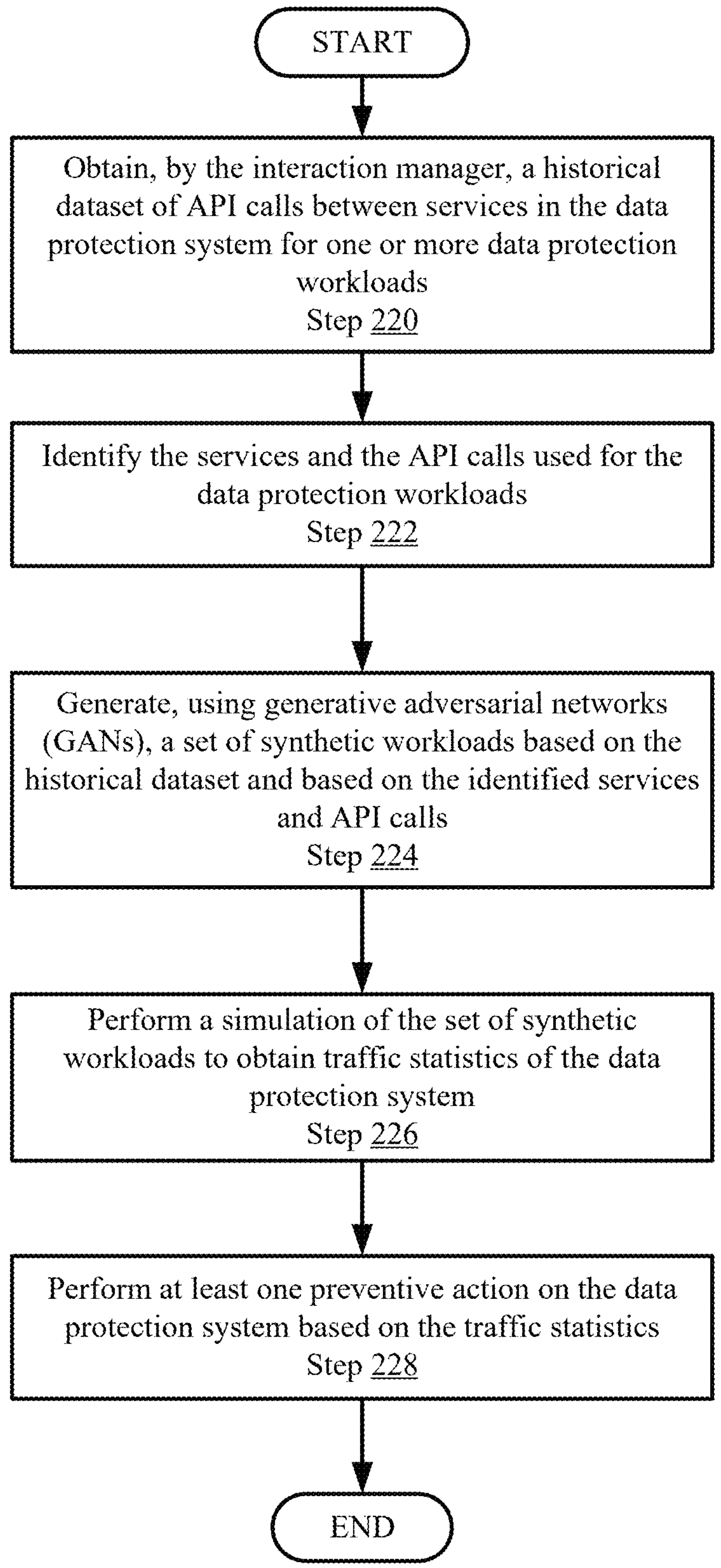
FIG. 2B shows a flowchart of a method for processing historical API calls using an API simulation engine in accordance with one or more embodiments of the invention.

FIG. 2B shows a flowchart of a method for processing historical API calls using an API simulation engine in accordance with one or more embodiments of the invention. The method shown in FIG. 2B may be performed by, for example, an interaction manager (150, FIG. 1). Other components of the system illustrated in FIGS. 1A-1B may perform the method of FIG. 2B without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 220, a historical dataset of API calls between services in the data protection system for one or more data protection workloads. In one or more embodiments, the historical dataset includes one or more API calls for previous data protection workloads executed in the data protection system. The historical API calls may be obtained from a database of the interaction manager. The historical API calls may include information such as, for example, request payloads, response payloads, response times, service interaction patterns, error scenarios that cause failures in the corresponding data protection workloads, and/or any other information.

In step 222, services and API calls associated with the data protection workload(s) in the historical dataset are identified. In one or more embodiments, the API calls are identified using an identifier corresponding to the data protection workload specified in each API call. The services may be identified based on whether a given service in the data protection system initiated or otherwise serviced one or more API calls that specified the identifier of the data protection workload.

In step 224, GANs are used to generate a set of synthetic workloads based on the historical dataset and based on the identified services and API calls. In one or more embodiments, the GANs include at least a generator and a discriminator. The generator may utilize any form of AI algorithms to generate synthetic workloads based on the historical API calls. The discriminator may evaluate the synthetic workloads to determine whether a given synthetic workload is from the historical data or an artificial workload generated by the generator. A data preprocessing may be performed on the historical API calls using the identified services and identified data protection workloads using an anonymization of the API calls to ensure data privacy, a normalization to maintain consistent formats, and segmentation to categorize the API calls by API types (e.g., request, response, product domain of a given data protection workload, use case, etc.).

The GANs may be trained iteratively using adversarial learning until the generator produces synthetic workloads that are indistinguishable to the discriminator between historical workloads or artificial workloads. Specialized loss functions may be used to optimize the trained model for accuracy in mimicking API behavior while maintaining variability.

In step 226, a simulation of the set of synthetic workloads are performed to obtain traffic statistics of the data protection workloads. In one or more embodiments, each of the set of synthetic workload are simulated using simulated services, discussed throughout the present disclosure, of the API simulation engine that execute the generated API calls of each synthetic workloads and monitoring the execution of the synthetic workloads to identify the impact of the synthetic workloads on the simulated environment via traffic statistics. For example, the API simulation engine may identify the stress conditions of the simulated environment, such as concurrent API calls, a high frequency of API requests issued, response times, network bandwidth, and fault scenarios such as network timeouts, unexpected payloads, or malformed requests. Other traffic statistics may be obtained from the simulation of the synthetic workloads without departing from the invention.

In one or more embodiments, the API simulation engine may include functionality for dynamically adjusting the synthetic traffic during simulations by, for example, introducing realistic variations in timing and payloads, simulating cross-product dependencies and cascading workflows (e.g., virtual machine orchestration initiating data protection system workloads), and evaluating how the API interactions respond under pre-defined conditions such as resource constraints, misconfigurations, or unexpected failures.

In step 228, at least one preventive action is performed on the data protection system based on the traffic statistics. In one or more embodiments, the preventive action includes replacing one of the services in the data protection system, modifying the services in the data protection system, modifying a sequence for executing the data protection workload, and/or other preventive actions without departing from the invention.

Figure 3A:
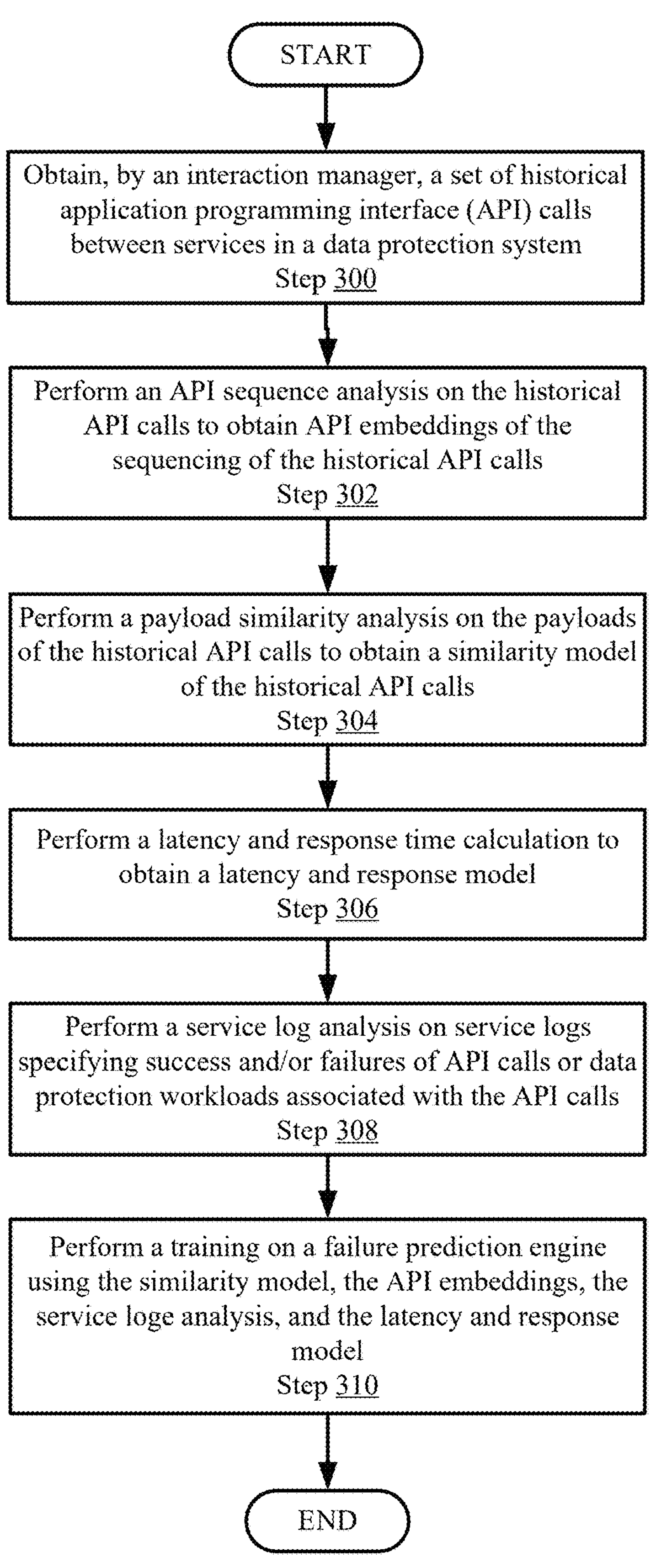
FIG. 3A shows a flowchart of a method for training a failure prediction engine in accordance with one or more embodiments of the invention.
Figure 3B:
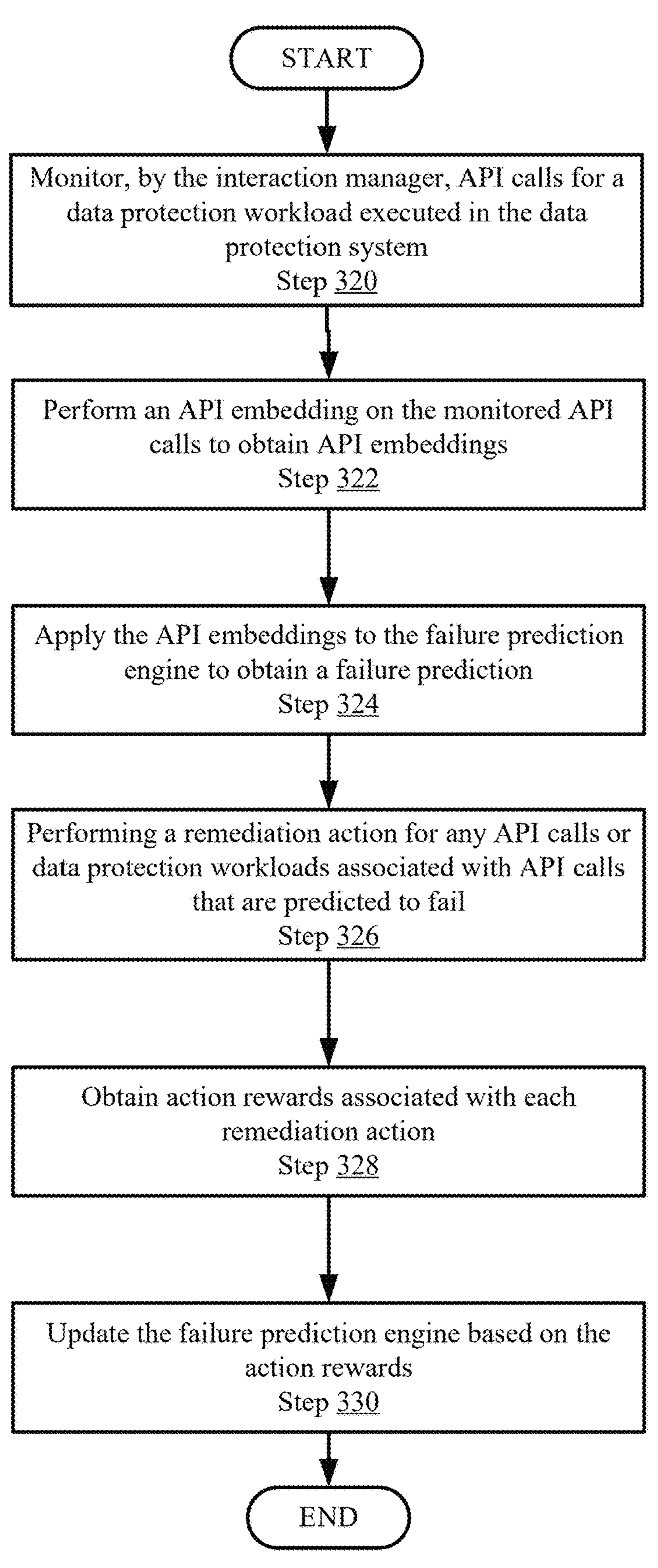
FIG. 3B shows a flowchart of a method for managing monitored data protection workloads in accordance with one or more embodiments of the invention.
Figure 3C:
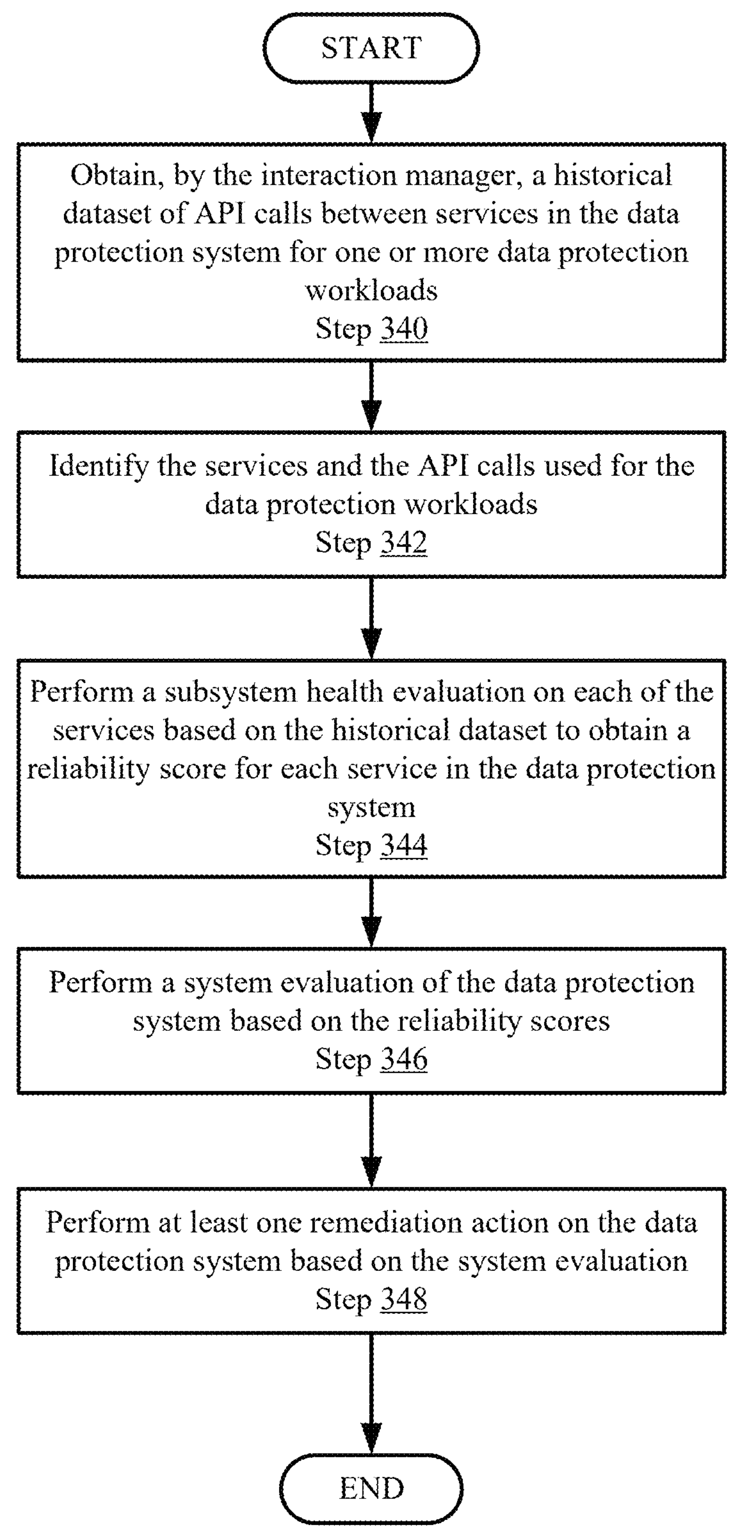
FIG. 3C shows a flowchart of a method for performing health evaluation of the data protection system in accordance with one or more embodiments of the invention.
Figure 3D:
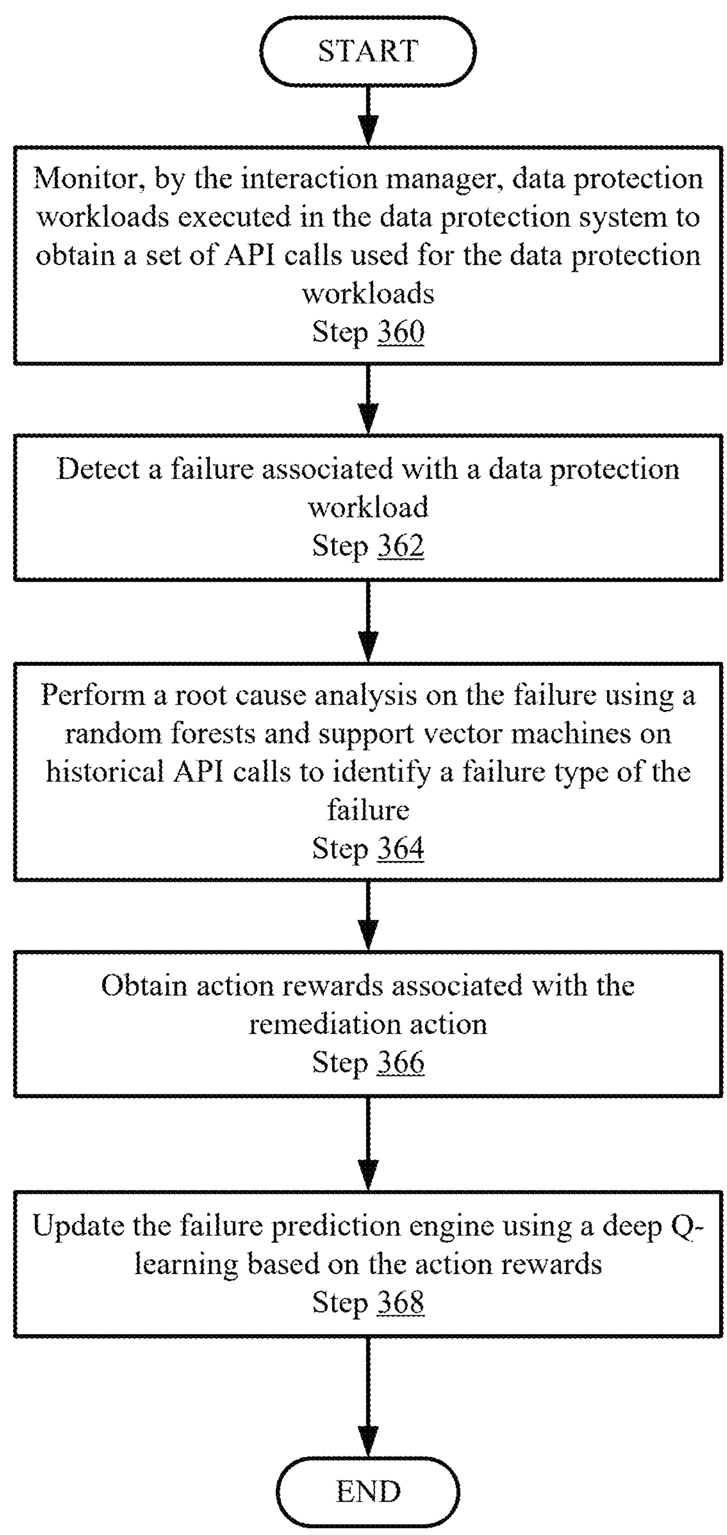
FIG. 3D shows a flowchart of a method for managing failures of data protection workloads using a root cause analysis in accordance with one or more embodiments of the invention.

In one or more embodiments, the preventive action includes performing a root cause analysis in accordance with the method of FIG. 3D for such synthetic workloads that result in a failure.

FIG. 3A shows a flowchart of a method for training a failure prediction engine in accordance with one or more embodiments of the invention. The method shown in FIG. 3A may be performed by, for example, an interaction manager (150, FIG. 1). Other components of the system illustrated in FIGS. 1A-1B may perform the method of FIG. 3A without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 300, a set of historical application programming interface (API) calls are obtained between services in a data protection system. In one or more embodiments, the API calls are obtained from a historical API dataset. In one or more embodiments, the historical dataset includes one or more API calls for previous data protection workloads executed in the data protection system. The historical API calls may be obtained from a database of the interaction manager. The historical API calls may include information such as, for example, request payloads, response payloads, response times, service interaction patterns, error scenarios that cause failures in the corresponding data protection workloads, and/or any other information.

In step 302, an API sequence analysis is performed on the historical API calls of the sequencing of the historical API calls. In one or more embodiments, the API sequence analysis includes using an API sequence analysis manager (154, FIG. 1B) to identify one or more sequences in accordance with one or more embodiments of the invention. The sequences may be specified in the API calls as API embeddings.

In step 304, a payload similarity analysis is performed on the payloads of the historical API calls to obtain a similarity model of the historical API calls. In one or more embodiments, the payload similarity analysis includes using a payload similarity analysis manager (156, FIG. 1B) to analyze the payload using the API embeddings in accordance with one or more embodiments of the invention. The payload similarity analysis may be used to train the similarity model of the RNN model discussed in FIG. 1B.

In step 306, a latency and response time calculation is performed to obtain a latency and response model. The latency and response time calculation includes using a latency and response time calculator engine (158, FIG. 1B) to calculate response times for API calls and to use the calculated response times and the previous failures to determine failure points and whether the failure points are caused by the response times. The latency and response time calculation may be used to train a latency and response model of the RNN model discussed above.

In step 308, a service log analysis is performed on service logs. In one more embodiments, the service logs may indicate whether an API call, or a corresponding data protection workload, experienced a success or failure. The service log analysis includes identifying the data protection workloads that fail, and tracking their success for purposes of RNN training of or more models.

In step 310, a training is performed on a failure prediction engine using the similarity model, the API embeddings, the service log analysis, and the latency and response model. In one or more embodiments, the training may be continuously and/or iteratively performed as new API calls are executed for new data protection workloads.

FIG. 3B shows a flowchart of a method for managing monitored data protection workloads in accordance with one or more embodiments of the invention. The method shown in FIG. 3B may be performed by, for example, an interaction manager (150, FIG. 1). Other components of the system illustrated in FIGS. 1A-1B may perform the method of FIG. 3B without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 320, API calls for data protection workloads are monitored to obtain a copy of relevant API calls. In one or more embodiments, the relevant API calls may be API calls that correspond to a data protection workload that resulted in a recent failure or that have not been completed. For example, the API calls may be obtained from each service initiating a request or response of the API calls. The API calls may be grouped based on the corresponding data protection workload.

In step 322, an API embedding is performed on the copy of API calls (also referred to as monitored API calls) to obtain API embeddings. In one or more embodiments, the API embeddings include applying a normalization on each API call in a data protection workload to generate a vectorized representation of each API call in the data protection workload. The vectorized representation may include standardized information about each API call for the purpose of failure prediction using the failure prediction engine. The vectorized information may include, for example, a unique identifier of the API call, a timestamp, a sequence of the API calls for a given data protection workload, and a payload of the response or request.

In step 324, the API embeddings are applied to the failure prediction engine to obtain a failure prediction. In one or more embodiments, the failure prediction engine applies the API embeddings to the RNN model trained using the method of FIG. 3A, and any corresponding intermediate models such as the latency and response model and the similarity model, and the RNN model outputs the failure prediction. The failure prediction may include, for example, one or more failure points that are predicted to may have caused the failure (or cause a future failure) to the given data protection workload. For example, the RNN may determine one or more patterns in the API calls and compare the determined pattern to one or more historical patterns to identify a correlated failure point.

In step 326, a remediation action is performed for any API calls or data protection workloads associated with API calls that are predicted to fail. In one or more embodiments, the remediation action (or preventive action if the failure point is a future failure point) includes replacing one or more services used for a data protection workload, altering a timeline of the data protection workload to delay execution of one or more data protection workloads, and modifying an ordering of future API calls. Other remediation actions or preventive actions may be performed without departing from the invention.

In step 328, action-rewards associated with each remediation action are obtained. In one or more embodiments, an action may be the remediation action and/or preventive action performed in response to the calculated failure points. The reward may be a value that is based on the results from applying a given action to the data protection system. For example, the reward may be calculated based on user response to the given action. An action-reward may be a mapping that pairs a calculated reward to a given action. The reward may be represented as a numerical value (e.g., a positive or negative integer).

In step 330, the failure prediction engine is updated based on the action rewards. In one or more embodiments, a reinforcement algorithm is applied to the RNN model to update the RNN algorithm and, in turn, updating the failure prediction engine. The reinforcement algorithm may be, for example, a deep-Q learning algorithm.

FIG. 3C shows a flowchart of a method for performing health evaluation of the data protection system in accordance with one or more embodiments of the invention. The method shown in FIG. 3C may be performed by, for example, an interaction manager (150, FIG. 1). Other components of the system illustrated in FIGS. 1A-1B may perform the method of FIG. 3C without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 340, a historical dataset of API calls are obtained between services in the data protection system for one or more data protection workloads. In one or more embodiments, the historical dataset includes one or more API calls for previous data protection workloads executed in the data protection system. The historical API calls may be obtained from a database of the interaction manager. The historical API calls may include information such as, for example, request payloads, response payloads, response times, service interaction patterns, error scenarios that cause failures in the corresponding data protection workloads, and/or any other information.

In step 342, services and API calls associated with the data protection workloads are identified. In one or more embodiments, the API calls are identified using an identifier corresponding to the data protection workload specified in each API call. The services may be identified based on whether a given service in the data protection system initiated or otherwise serviced one or more API calls that specified the identifier of the data protection workload.

In step 344, a subsystem health evaluation is performed on each of the services based on the historical dataset to obtain a reliability score for each service in the data protection system. In one or more embodiments, the subsystem health evaluation includes calculating a dynamic reliability score for each API call using the obtained historical dataset and using the failure prediction engine. The dynamic reliability score may be a value that represents a reliability that the API call is not to cause a failure of the corresponding data protection workload. The reliability scores may be compared to identify any high-risk API calls. Based on the services that initiate or otherwise service API calls, the reliability scores are aggregated on a per-service level to evaluate the health of each identified service. For example, a service of the data protection system that issues high-risk API calls may be deemed a low-health service. In contrast, a service that responds promptly and issue API calls with high reliability scores is deemed a high-health service. A reliability score for each service may be calculated based on the corresponding level of health.

In one or more embodiments, the reliability scores are calculated using factors such as, for example, an error rate for a number of failed API requests over a period, a latency and response by each service, and a throughput such as a volume of API calls serviced successfully by a service within a given window.

In step 346, a system evaluation of the data protection system is performed based on the reliability scores. In one or more embodiments, the system evaluation includes applying, by the failure prediction engine, a machine learning algorithm on the reliability scores of the services to predict potential service failures. The machine learning algorithm may include, for example, auto-regressive integrated moving average (ARIMA), long short-term memory (LSTM) networks, or anomaly detection algorithms such as isolation forests or autoencoders.

In step 348, at least one remediation action is performed on the data protection system based on the system evaluation. In one or more embodiments, the remediation action includes re-initiating one or more data protection workloads, re-organizing the order of tasks to reduce overloading or disordering of API calls, and otherwise resolving any dependencies between API calls. Other remediation actions include, for example, replacing or updating one or more services in the data protection system, or modifying the data protection workload.

FIG. 3D shows a flowchart of a method for managing failures of data protection workloads using a root cause analysis in accordance with one or more embodiments of the invention. The method shown in FIG. 3D may be performed by, for example, an interaction manager (150, FIG. 1). Other components of the system illustrated in FIGS. 1A-1B may perform the method of FIG. 3D without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 360, data protection workloads executed in the data protection system are monitored. In one or more embodiments, the relevant API calls may be API calls that correspond to a data protection workload that resulted in a recent failure or that have not been completed. For example, the API calls may be obtained from each service initiating a request or response of the API calls. The API calls may be grouped based on the corresponding data protection workload.

In step 362, a failure associated with at least one data protection workload is detected. In one or more embodiments, the failure is detected based on a failure notification indicating the failure. Alternatively, the failure is detected based on the monitoring of the API calls. For example, one or more of the API calls may indicate, e.g., based on the respective payload, that a data protection workload has failed.

In step 364, a root cause analysis is performed on the failure using a random forest and support vector machines (SVMs) applied to a set of historical API calls to identify a failure type of the failure. In one or more embodiments, the failure is detected based on a machine learning model trained using either the random forest, isolation forest, or SVMs algorithms.

The training may be performed using a historical API dataset and applying the anomaly detection algorithm (e.g., isolation forests) on calculated failure points to isolate anomalies in the historical API dataset. For example, the model may be trained on normal system behavior to establish baseline distributions of data protection workloads. Additional training data may include timestamps of system events, service dependency matrices, anomaly timelines, and error propagation paths. Training features include response times, service call frequencies, request payload sizes, and resource usage patterns of services. The trained machine learning model may identify deviations from the baseline distributions to output potential failures based on identified anomalies.

In one or more embodiments, the monitored API calls for a failed data protection workload are embedded with API embeddings and applied to the trained machine learning model to obtain one or more failure points. The failure points are analyzed using a root cause analysis using a random forest or a SVMs algorithm. In one or more embodiments, the random forests algorithm includes analyzing multi-dimensional data such as error codes, resource usage spikes, and API dependency graphs to identify importance and classify the detected anomalies into categories such as, for example, network congestion, hardware failure, service timeout, or service configuration errors. The SVMs algorithm may include additional refinement of the random forests algorithm by separating failure categories with higher precision. The SVMs algorithm may be beneficial in such API calls embedded with a large number of dimensions and fewer samples per failure type. Supervised learning may be performed by labelling historical data with one or more failure types. The output of the failure points include identifying one or more failure types of the monitored data protection workload.

In step 366, an action-reward associated with the remediation action is obtained. In one or more embodiments, an action may be a remediation action and/or preventive action performed in response to the identified failure types. The reward may be a value that is based on the results from applying a given action to the data protection system. For example, the reward may be calculated based on user response to the given action. An action-reward may be a mapping that pairs a calculated reward to a given action. The reward may be represented as a numerical value (e.g., a positive or negative integer).

In step 368, the failure prediction engine is updated using a deep-Q learning based on the action-reward. In one or more embodiments, a reinforcement algorithm is applied to the RNN model to update the RNN algorithm and, in turn, updating the failure prediction engine. The reinforcement algorithm may be, for example, the deep-Q learning algorithm. The deep-Q learning algorithm may include identifying states of the system, mapping a given action-reward to the state, updating a model that calculates a given reward, and modifying suggested actions to be recommended for a given state. Q values may be generated for each pairing of state and action-reward, and the Q-values may be improved over multiple iterations of reinforcement learning to improve the recommendation of actions to be generated for given failure points and/or failure types.

Example 1

Figure 4A:
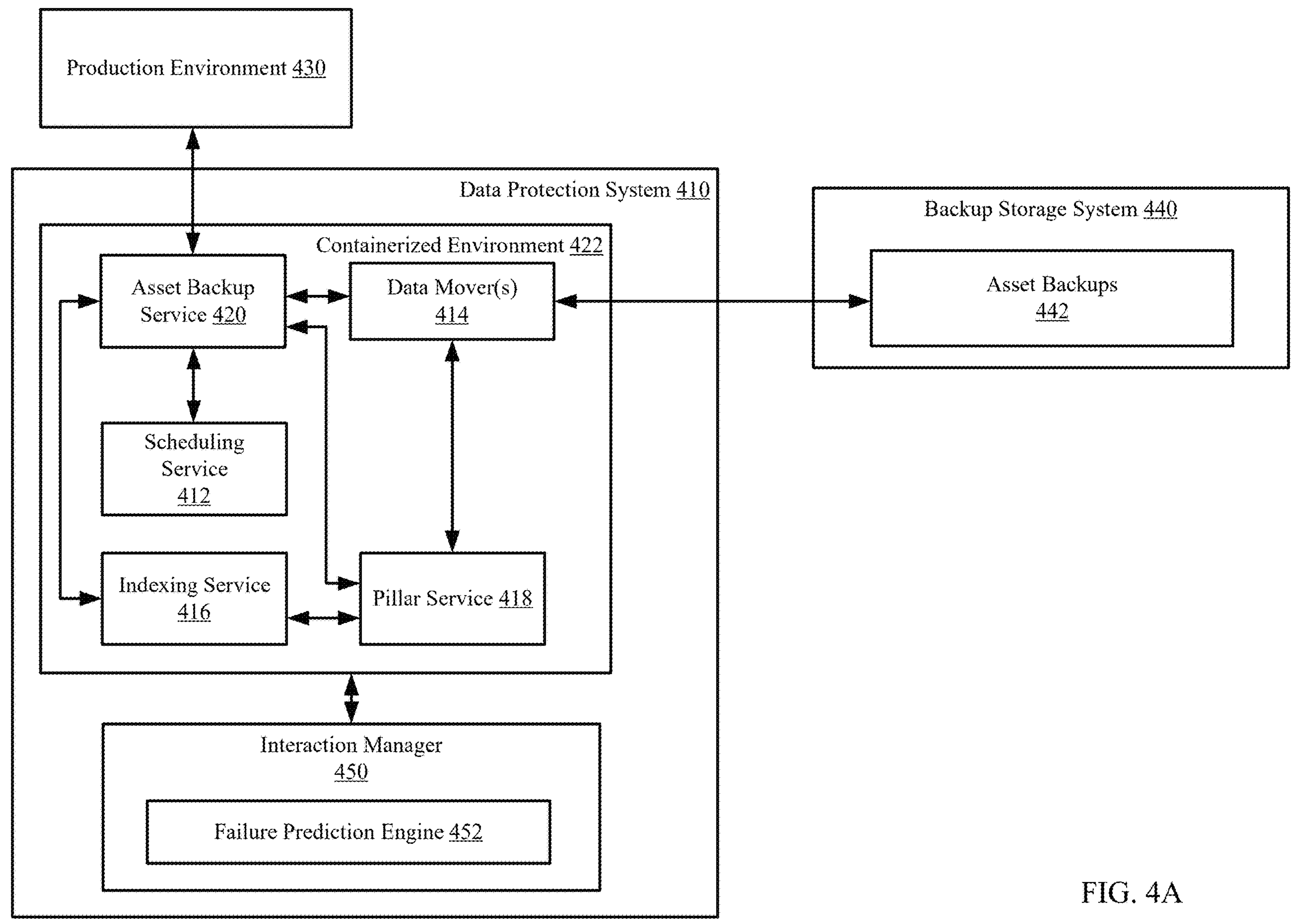
FIGS. 4A-4B show an example in accordance with one or more embodiments of the invention.

To clarify aspects of the invention such as, for example, the methods of FIGS. 3A-3D, the following describes a first example in accordance with one or more embodiments of the invention. The first example, described using FIG. 4A, is not intended to limit aspects of the invention. In the example, consider a scenario in which a data protection system provides systems and methods for data protection tasks such as backing up assets, restoring the assets, or indexing services of the backed up assets.

Turning to the first example, FIG. 4A shows a diagram of an example system in accordance with one or more embodiments of the invention. The example system includes a containerized environment (422) of a data protection system (410) that provides data protection services for assets of a production environment (430) by implementing data protection workloads to back up or recover asset backups (442) stored in a backup storage system (440). To perform the data protection workloads, the containerized environment (422) includes an asset backup service (420), a data mover (414), a scheduling service (412), an indexing service (416), and a pillar service (418). The services (420, 414, 412, 416, 418) may communicate with each other via API calls. For example, any service may issue an API request for information or an action to be taken by another service. Similarly, any service may issue an API response to an obtained API request.

The example system further includes an interaction manager (450) that monitors and captures copies of the API calls for processing. The processing may be performed in accordance with the descriptions of the methods of FIGS. 2A-2B and FIGS. 3A-3B. For example, the API calls may be used to generate API embeddings, obtaining a similarity model, a latency and response model, and training the failure prediction engine (452) using the similarity model, the API embeddings, and the latency and response model. The failure prediction engine (452) in this example is implemented as a RNN model where the similarity model and the latency and response model are each layers in the RNN model.

The failure prediction engine (452) may be further trained in accordance with the method of FIG. 3C. Specifically, the failure prediction engine (462) may obtain a system evaluation as an input and output one or more recommendations for remediation actions to resolve issues with the containerized environment (422) or to prevent future issues.

End of Example 1

Example 2

Figure 4B:
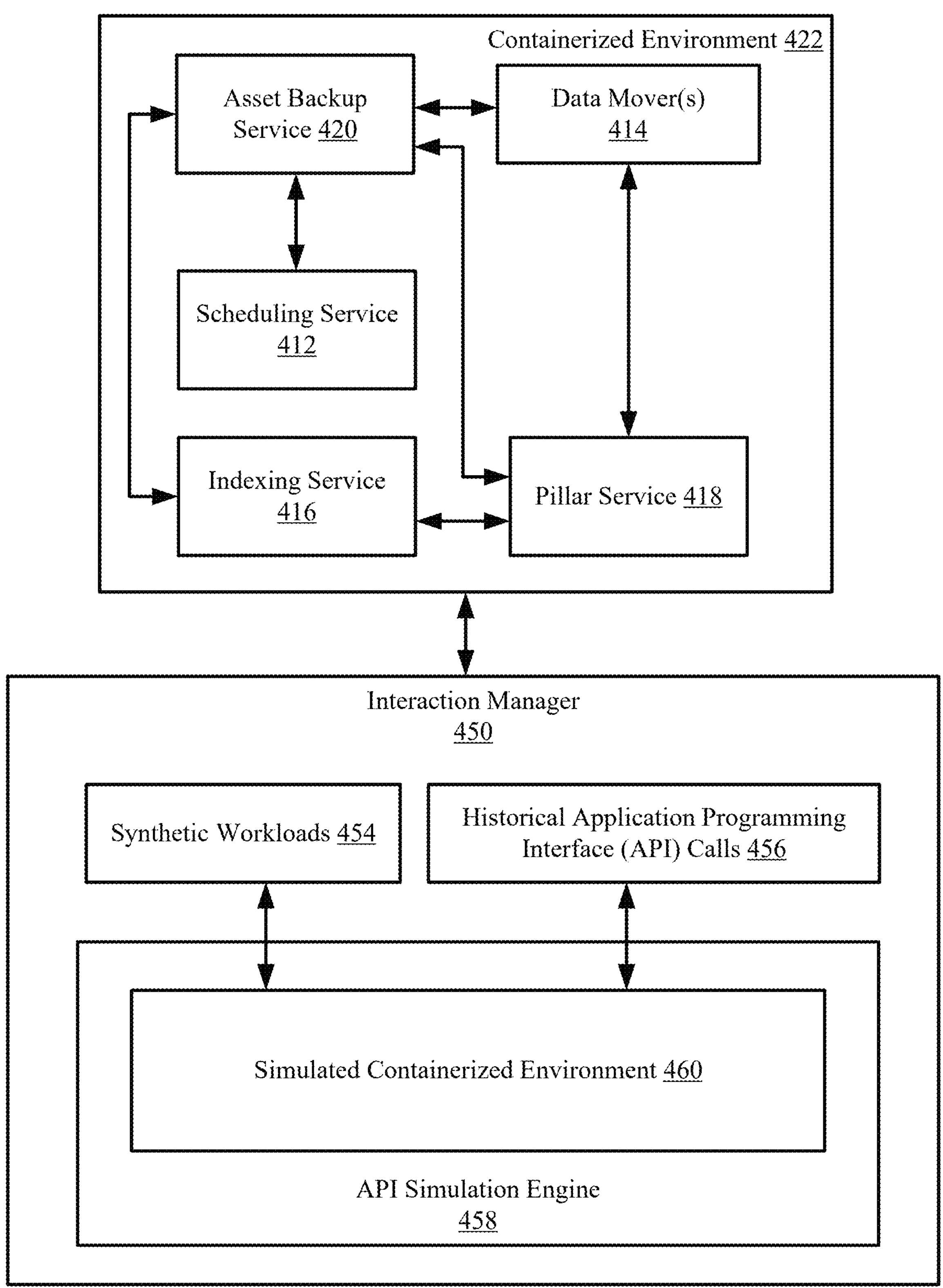

To clarify aspects of the invention such as, for example, the methods of FIGS. 2A-2B, the following describes a first example in accordance with one or more embodiments of the invention. The second example, described using FIG. 4B, is not intended to limit aspects of the invention. In the example, consider a scenario in which a data protection system provides systems and methods for data protection tasks such as backing up assets, restoring the assets, or indexing services of the backed up assets.

Turning to the second example, FIG. 4B shows a diagram of shows a diagram of an example system in accordance with one or more embodiments of the invention. The example system includes a containerized environment (422) of a data protection system that provides data protection services for assets of a production environment (not shown) by implementing data protection workloads. To perform the data protection workloads, the containerized environment (422) includes an asset backup service (420), a data mover (414), a scheduling service (412), an indexing service (416), and a pillar service (418). The services (420, 414, 412, 416, 418) may communicate with each other via API calls. For example any service may issue an API request for information or an action to be taken by another service. Similarly, any service may issue an API response to an obtained API request.

The example system further includes an interaction manager (450) that monitors and captures copies of the API calls for processing. Copies of the API calls may be stored as historical API calls (456) of the interaction manager (450).

When a data protection workload is detected to fail, the interaction manager (450) invokes the API simulation engine (458) to process the API calls corresponding to the failed data protection workload. The API calls are processed in accordance with the method of FIG. 2A. Specifically, the copies of the API calls are processed by an API simulation engine (458). The API simulation engine (458) simulates one or more services (420, 414, 412, 416, 418) in a simulated containerized environment (460), and has the simulated services perform a replay framework on (e.g., re-execute) the copies of the API calls in the simulated containerized environment (460). The replay framework may be analyzed to detect one or more failure points associated with the failure of the data protection workload. The detected failure points may be processed using the failure prediction engine (452) in accordance with, for example, the first example in FIG. 4A.

The API simulation engine (458) further includes functionality for generating synthetic workloads (454) in accordance with the method of FIG. 2B using the historical API calls (456) collected and stored for an extended period of time. The synthetic workloads may represent potential or future possible data protection workloads that may be executed in the containerized environment (422). One or more of the synthetic workloads (454) may include a series of API calls that represent a data protection workload that ends in a failure. For such synthetic workloads, the replay framework may be applied to the corresponding API calls in the corresponding sequence to evaluate such synthetic workloads and identify the failure point(s). The detected failure points may be processed using the failure prediction engine (452) in accordance with, for example, FIG. 2B to determine at least one preventive action to address potential failures of the containerized environment (422) in the future.

End of Example 2

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention provide management of data protection workloads by monitoring and analyzing the communications of services used for the data protection workloads. Specifically, embodiments of the invention obtain API calls used for such communication, and may perform simulation or AI processing of the API calls to remediate any failures and prevent future potential failures. By utilizing the interaction manager for such functionalities, embodiments of the invention improve the seamless operation of the data protection system for performing backups and restoration of assets by limiting the causes of failures and promptly resolving any failures that are caused by the communications.

Embodiments of the invention may scale efficiently with complex and large-scale environments, adapting to the dynamic flow of API calls without predefined constraints.

Thus, embodiments of the invention may address the problem of inefficient use of computing resources. This problem arises due to the technological nature of the environment in which file systems are utilized.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing a data protection system, the method comprising:

monitoring, by an interaction manager, a data protection workload executing on the data protection system, wherein the data protection system comprises a plurality of services, and wherein the data protection workload is executed by the plurality of services communicating with each other using application programming interface (API) calls;

obtaining, based on the monitoring, a copy of the API calls;

performing an embedding on the copy of the API calls to obtain API embeddings;

applying the API embeddings to a failure prediction engine to obtain a failure prediction for the data protection workload;

performing a remediation action on the API calls to remediate the data protection workload, wherein the remediation action comprises at least one of: re-initiating the data protection workload and replacing one of the plurality of services;

updating the failure prediction engine based on the remediation action;

obtaining a set of historical API calls between the plurality of services for previous data protection workloads;

performing an API sequence analysis on the set of historical API calls to obtain second API embeddings of a sequencing of the set of historical API calls;

performing a payload similarity analysis on payloads of each of the set of historical API calls to obtain a similarity model of the set of historical API calls;

performing a service log analysis on services logs associated with the previous data protection workloads, wherein the service logs each indicate a result of each of the previous data protection workloads; and performing a training on the failure prediction engine using the similarity model, the second API embeddings, and the service log analysis.

2. The method of claim 1, wherein one of the previous data protection workloads resulted in a failure based on an issue caused by one of the set of historical API calls, and wherein one of the service logs indicates the failure.

3. The method of claim 1, further comprising:

performing, by the interaction manager, a latency and response time calculation on the set of historical API calls to obtain a latency and response model, wherein the training is further based on the latency and response model.

4. The method of claim 1, wherein updating the failure prediction engine comprises updating an action-reward associated with the remediation action and applying a reinforcement learning on the failure prediction engine based on the action-reward.

5. The method of claim 1, wherein the plurality of services comprises: an asset backup service, a pillar service, an asset restoration service, a scheduler, and a user interface communicating with a client device.

6. The method of claim 1, wherein the failure prediction is based on one of a list consisting of: one of the API calls being initiated out of order, an overloading of one of the plurality of services, and a detected latency issue.

7. A non-transitory computer readable medium comprising computer readable program code, which when executed by a computer processor enables the computer processor to perform a method for managing a data protection system, the method comprising:

monitoring, by an interaction manager, a data protection workload executing on the data protection system, wherein the data protection system comprises a plurality of services, and wherein the data protection workload is executed by the plurality of services communicating with each other using application programming interface (API) calls;

obtaining, based on the monitoring, a copy of the API calls;

performing an embedding on the copy of the API calls to obtain API embeddings;

applying the API embeddings to a failure prediction engine to obtain a failure prediction for the data protection workload;

performing a remediation action on the API calls to remediate the data protection workload, wherein the remediation action comprises at least one of: re-initiating the data protection workload and replacing one of the plurality of services;

updating the failure prediction engine based on the remediation action;

obtaining a set of historical API calls between the plurality of services for previous data protection workloads;

performing an API sequence analysis on the set of historical API calls to obtain second API embeddings of a sequencing of the set of historical API calls;

performing a payload similarity analysis on payloads of each of the set of historical API calls to obtain a similarity model of the set of historical API calls;

performing a service log analysis on services logs associated with the previous data protection workloads, wherein the service logs each indicate a result of each of the previous data protection workloads; and performing a training on the failure prediction engine using the similarity model, the second API embeddings, and the service log analysis.

8. The non-transitory computer readable medium of claim 7, wherein one of the previous data protection workloads resulted in a failure based on an issue caused by one of the set of historical API calls, and wherein one of the service logs indicates the failure.

9. The non-transitory computer readable medium of claim 7, the method further comprising:

performing, by the interaction manager, a latency and response time calculation on the set of historical API calls to obtain a latency and response model, wherein the training is further based on the latency and response model.

10. The non-transitory computer readable medium of claim 7, wherein updating the failure prediction engine comprises updating an action-reward associated with the remediation action and applying a reinforcement learning on the failure prediction engine based on the action-reward.

11. The non-transitory computer readable medium of claim 7, wherein the plurality of services comprises: an asset backup service, a pillar service, an asset restoration service, a scheduler, and a user interface communicating with a client device.

12. The non-transitory computer readable medium of claim 7, wherein the failure prediction is based on one of a list consisting of: one of the API calls being initiated out of order, an overloading of one of the plurality of services, and a detected latency issue.

13. A system comprising:

an interaction manager, operating on a processor; and memory comprising instructions, which when executed by the processor, perform a method comprising:

monitoring, by an interaction manager, a data protection workload executing on a data protection system, wherein the data protection system comprises a plurality of services, and wherein the data protection workload is executed by the plurality of services communicating with each other using application programming interface (API) calls;

obtaining, based on the monitoring, a copy of the API calls;

performing an embedding on the copy of the API calls to obtain API embeddings;

applying the API embeddings to a failure prediction engine to obtain a failure prediction for the data protection workload;

performing a remediation action on the API calls to remediate the data protection workload, wherein the remediation action comprises at least one of: re-initiating the data protection workload and replacing one of the plurality of services;

updating the failure prediction engine based on the remediation action;

obtaining a set of historical API calls between the plurality of services for previous data protection workloads;

performing an API sequence analysis on the set of historical API calls to obtain second API embeddings of a sequencing of the set of historical API calls;

performing a payload similarity analysis on payloads of each of the set of historical API calls to obtain a similarity model of the set of historical API calls;

performing a service log analysis on services logs associated with the previous data protection workloads, wherein the service logs each indicate a result of each of the previous data protection workloads; and performing a training on the failure prediction engine using the similarity model, the second API embeddings, and the service log analysis.

14. The system of claim 13, wherein one of the previous data protection workloads resulted in a failure based on an issue caused by one of the set of historical API calls, and wherein one of the service logs indicates the failure.

15. The system of claim 13, wherein updating the failure prediction engine comprises updating an action-reward associated with the remediation action and applying a reinforcement learning on the failure prediction engine based on the action-reward.

16. The system of claim 13, wherein the plurality of services comprises: an asset backup service, a pillar service, an asset restoration service, a scheduler, and a user interface communicating with a client device.

17. The system of claim 13, wherein the failure prediction is based on one of a list consisting of: one of the API calls being initiated out of order, an overloading of one of the plurality of services, and a detected latency issue.

* * * * *